United States Patent
Kano (10) Patent No.: US 9,913,349 B2
(45) Date of Patent: Mar. 6, 2018

(54) DISPLAY APPARATUS AND METHOD FOR CONTROLLING REGION FOR LUMINANCE REDUCTION

(71) Applicant: NEC Display Solutions, Ltd., Tokyo (JP)

(72) Inventor: Nozomu Kano, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 188 days.

(21) Appl. No.: 15/074,743

(22) Filed: Mar. 18, 2016

(65) Prior Publication Data

US 2016/0286626 A1 Sep. 29, 2016

(30) Foreign Application Priority Data

Mar. 26, 2015 (JP) ................................. 2015-063736

(51) Int. Cl.
*H05B 37/02* (2006.01)
*G09G 3/34* (2006.01)

(52) U.S. Cl.
CPC ....... *H05B 37/0227* (2013.01); *G09G 3/3426* (2013.01); *G09G 2330/021* (2013.01); *G09G 2354/00* (2013.01); *Y02B 20/40* (2013.01); *Y02B 20/44* (2013.01)

(58) Field of Classification Search
CPC ........................... H05B 37/0227; G09G 3/3406
See application file for complete search history.

(56) References Cited

U.S. PATENT DOCUMENTS

2009/0315869 A1* 12/2009 Sugihara ............... G06F 1/1605
345/204
2011/0001763 A1* 1/2011 Murakami ............... G09G 5/14
345/661

FOREIGN PATENT DOCUMENTS

| JP | 2000-066168 A | | 3/2000 |
|---|---|---|---|
| JP | 2006126229 A | * | 5/2006 |
| JP | 2009-122276 A | | 6/2009 |
| JP | 2010-224075 A | | 10/2010 |
| JP | 2013-238774 A | * | 11/2013 |
| JP | 2013-238774 A | | 11/2013 |

* cited by examiner

*Primary Examiner* — Dedei K Hammond
(74) *Attorney, Agent, or Firm* — McGinn I.P Law Group, PLLC.

(57) ABSTRACT

A display apparatus includes a sight line detection sensor that detects a sight line of a user; a distance measurement sensor that measures a distance between a display panel and a user; and a control unit that determines a control region set in separate light emitting parts arranged on the display panel, where an amount of light emission is controlled in the control region, based on the sight line detected by the sight line detection sensor and the distance measured by the distance measurement sensor. Typically, the control unit determines the control region in a manner such that the longer the distance measured by the distance measurement sensor, the smaller the control region, and the shorter the distance measured by the distance measurement sensor, the larger the control region.

13 Claims, 5 Drawing Sheets

DISPLAY APPARATUS AND METHOD FOR CONTROLLING REGION FOR LUMINANCE REDUCTION

BACKGROUND OF THE INVENTION

Field of the Invention

The present invention relates to a display apparatus, a display method, and a display program.

Priority is claimed on Japanese Patent Application No. 2015-063736, filed Mar. 26, 2015, the contents of which are incorporated herein by reference.

Description of the Related Art

A light source control device is known, which reduces power consumption of a display apparatus without reducing the brightness of a region (of the display apparatus) gazed by a user (see, for example, Japanese Unexamined Patent Application, First Publication No. 2013-238774).

In addition, an automatic light control system is known, which measures a distance up to a user and controls backlight emission of a liquid crystal display apparatus based on relevant distance information so as to reduce the power consumption (see, for example, Japanese Unexamined Patent Application, First Publication No. 2010-224075).

Furthermore, a display apparatus which measures a viewing direction of the driver of a vehicle is known, where if it is determined that the measured viewing direction is toward a screen of the display apparatus, the amount of light of a relevant light source is set to a "viewing" value, and if it is determined that the driver is currently not viewing the screen, the amount of light of the light source is set to a "standby" value (see, for example, Japanese Unexamined Patent Application, First Publication No. 2009-122276).

Additionally, a liquid crystal display apparatus is known, which detects a position (on a display plate) gazed by a user and turns on or flickers a backlight panel which irradiates the detected position and a sectional area in the vicinity thereof (see, for example, Japanese Unexamined Patent Application, First Publication No. 2000-066168).

However, conventional display apparatuses cannot perform backlight control in accordance with a user's viewing field. Therefore, if the entire backlight is darkened so as to reduce the power consumption, a display part viewed by the user is also darkened, which may degrade the visibility.

SUMMARY OF THE INVENTION

In order to solve the above problem, an object of the present invention is to provide a display apparatus, a display method, and a display program, which can reduce power consumption of a backlight without degrading the visibility for the user.

Therefore, the present invention provides a display apparatus comprising:

a sight line detection sensor that detects a sight line of a user;

a distance measurement sensor that measures a distance between a display panel and a user; and a control unit that determines a control region set in separate light emitting parts arranged on the display panel, where an amount of light emission is controlled in the control region, based on the sight line detected by the sight line detection sensor and the distance measured by the distance measurement sensor.

The present invention also provides a display method comprising:

a sight line detection step that detects a sight line of a user;

a distance measurement step that measures a distance between a display panel and a user; and a control step that determines a control region set in separate light emitting parts arranged on the display panel, where an amount of light emission is controlled in the control region, based on the sight line detected by the sight line detection step and the distance measured by the distance measurement step.

The present invention also provides a non-transitory computer-readable storage medium which stores a display program that makes a computer execute:

a sight line detection step that detects a sight line of a user;

a distance measurement step that measures a distance between a display panel and a user; and a control step that determines a control region set in separate light emitting parts arranged on the display panel, where an amount of light emission is controlled in the control region, based on the sight line detected by the sight line detection step and the distance measured by the distance measurement step.

DETAILED DESCRIPTION OF THE INVENTION

Hereinafter, embodiments of the present invention will be described with reference to the appended figures.

Figure 1:
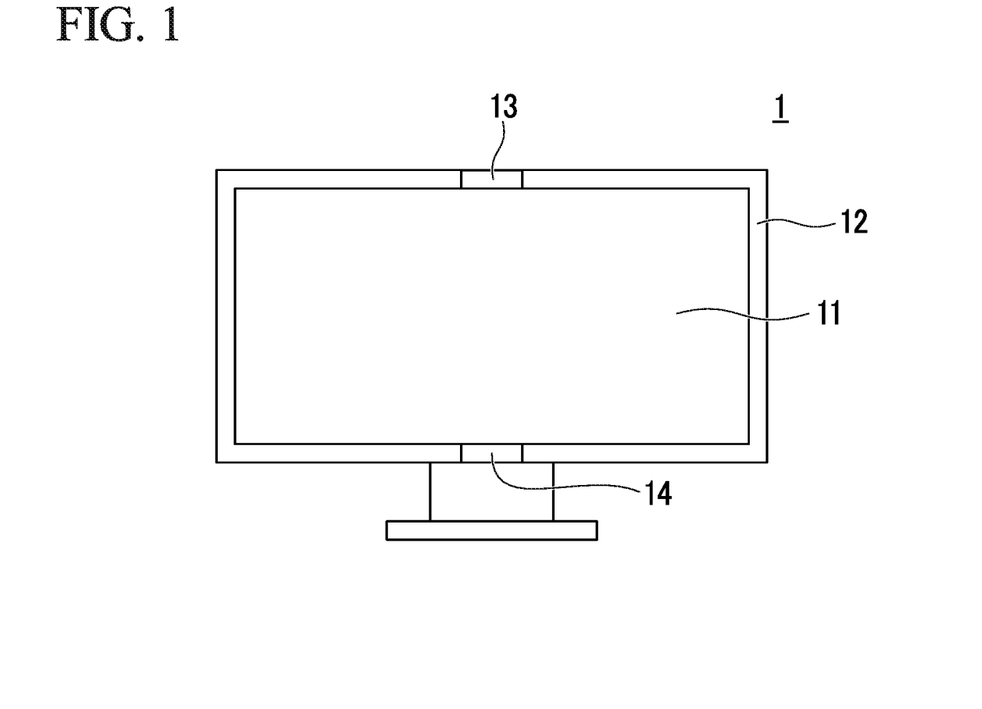
FIG. 1 is a front view that shows a general structure of a display apparatus as an embodiment of the present invention.

FIG. 1 is a front view that shows a general structure of a display apparatus as an embodiment of the present invention. In FIG. 1, a display apparatus 1 has a display unit 11, a bezel 12, a sight line detection sensor 13, and a distance measurement sensor 14.

The display unit 11 displays an image input from an image input unit (not shown). The display unit 11 may have a liquid crystal panel. In the present embodiment, the display unit 11 performs so-called "local dimming" (local luminance control) in which dimming is performed for a set of divided regions. The display unit 11 will be explained later in detail.

The bezel 12 is an outside frame provided around the display unit 11. The sight line detection sensor 13 and the distance measurement sensor 14 explained below are each provided at a part of the bezel 12 and are directed to a user who views an image displayed on the display unit 11.

The sight line detection sensor 13 detects the sight line of the user who views the image displayed on the display unit 11. Any method can be employed for the sight line detection sensor 13 to detect the user's sight line.

In an example method, the sight line detection sensor 13 has a camera utilized to obtain an image (or images) in which the eye shape (including the inner corner) of the user and a motion of the iris of a user's eyeball are recorded. From the obtained image(s), the sight line detection sensor 13 recognizes the positions of the user's inner corner and the iris. The sight line detection sensor 13 can detect the relevant sight line based on a positional relationship between a reference point which is the recognized position of the inner corner and a motion point which is the recognized position of the iris.

In another example, the sight line detection sensor 13 applies an infrared ray emitted from an infrared LED to the user so as to recognize a position of corneal reflection, at which the infrared ray is reflected, and a pupil by means of camera photographing, where the sight line is detected based on a positional relationship between the position of corneal reflection (as a reference point) and the pupil.

The user's sight line detected by the sight line detection sensor 13 may be detected as a solid angle measured from the position (as a reference) at which the sight line detection sensor 13 is attached (see FIG. 1) towards the direction of the user's sight line.

In addition, the sight line detection sensor 13 may obtain the image utilized to detect the sight line as a static image or a video.

Any frequency of detecting the user's sight line from the obtained image(s) can be employed. For example, the detection frequency may be set to "once per second" so as to capture the obtained video once per second and detect the sight line from the captured images. In another example, a static image is obtained once per second so as to detect the sight line from the obtained static images. In addition, the detection frequency may be a fixed value or a variable value. For example, the detection frequency may be varied in accordance with the image displayed on the display unit 11.

In the present embodiment, the sight line detection sensor 13 is utilized to detect the sight line of one user. However, the sight line detection sensor 13 may detect the sight lines of a plurality of users. If the image obtained by the sight line detection sensor 13 includes a plurality of users, the individual sight lines of the relevant users may be detected. In addition, the sight line of a user who has the longest distance among distances measured by the distance measurement sensor 14 (explained later) may be detected.

Also in the present embodiment, one sight line detection sensor 13 is employed. However, a plurality of sight line detection sensors may be employed. In this case, individual ranges for the user detection may be assigned to the sight line detection sensors.

Furthermore, one sight line detection sensor 13 may detect the sight line of one user or the sight lines of a plurality of users.

The distance measurement sensor 14 measures a distance between the display unit 11 and a user who is viewing the image displayed on the display unit 11. Any method can be employed to measure the distance. For example, the distance may be measured by using a sensor which employs an infrared ray or a laser beam.

In the present embodiment, the distance measurement sensor 14 is utilized to measure the distance for one user. However, the distance measurement sensor 14 may measure the distances for a plurality of users. If the distance measurement sensor 14 scans a predetermined measurement range as a radar apparatus, one distance measurement sensor 14 can detect a plurality of users and measure the distances up to the individual users.

Also in the present embodiment, one distance measurement sensor 14 is employed. However, a plurality of distance measurement sensors 14 may be employed. In this case, each distance measurement sensor 14 may have an individual range for the position of the user.

Additionally, in the present embodiment, the display apparatus has one display unit. However, if a plurality of display units are arranged collectively as a multi-monitor system, the plurality of display units may be formed as one display apparatus.

The explanation (using FIG. 1) of the general structure of the display apparatus as an embodiment of the present invention is ended here.

Next, with reference to FIGS. 2 and 3, the structure of the display unit 11 will be explained.

Figure 2:
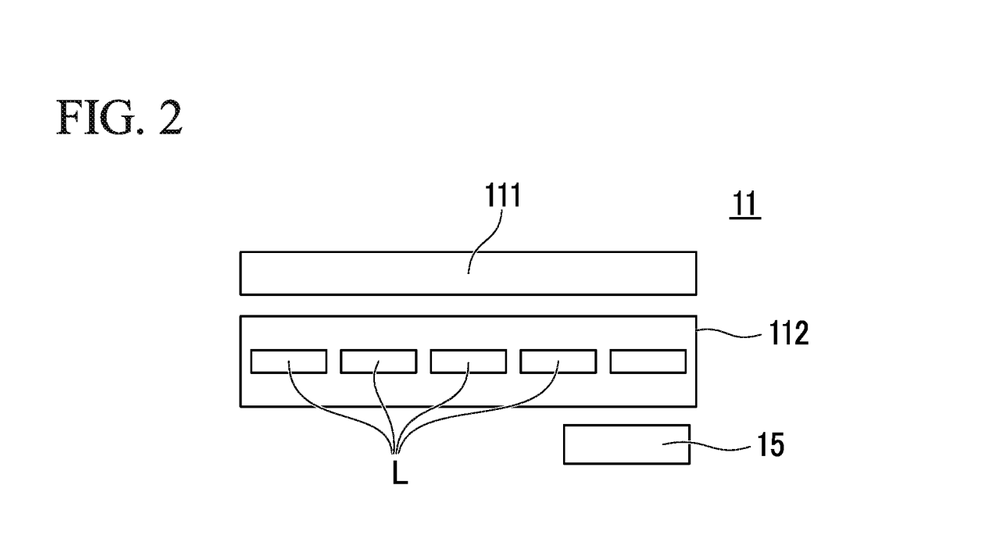
FIG. 2 is a sectional view that shows the structure of a display unit.

FIG. 2 is a sectional view obtained when the display unit 11 is cut in a vertical direction to the paper surface. In FIG. 2, the display unit 11 has a liquid crystal panel 111 and a backlight 112. In the present embodiment, an liquid crystal panel is employed as the display panel.

The backlight 112 has light emitting parts L which are separate (divided) regions arranged on the back surface of the liquid crystal panel 111. Each light emitting part L has a predetermined area, and the light amount control is performed for each light emitting part L (as a unit for the control).

The present embodiment employs, as an example, a direct (type) backlight which is arranged on the back surface of the liquid crystal panel 111 so that light is directly transmitted through the liquid crystal panel 111.

Each light emitting part L has one or more light sources. The light source may be an LED (light emitting diode), a cold cathode tube, a fluorescence tube, an EL (Electroluminescence) element, or the like.

Figure 3:
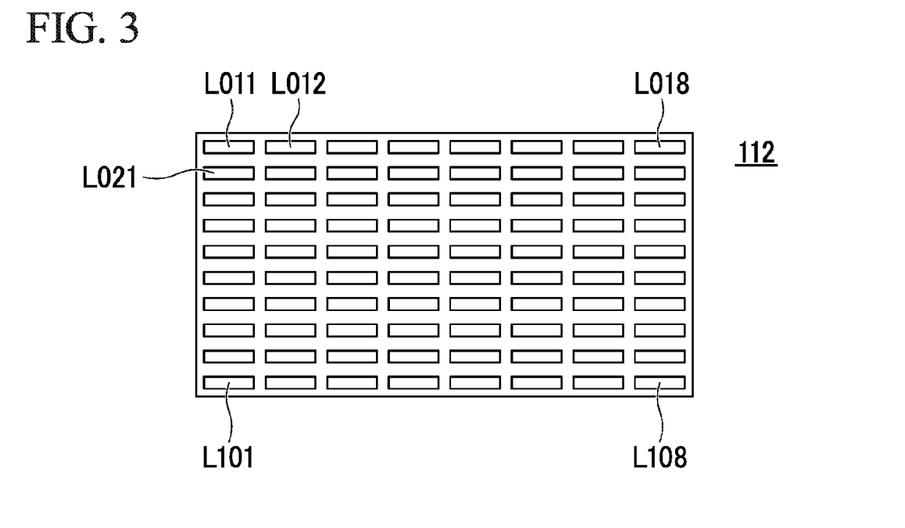
FIG. 3 is a front view that shows an example arrangement of separate light emitting parts as the plurality of regions.

FIG. 3 is a front view of the backlight 112, utilized to show an example arrangement of the separate light emitting parts L as the plurality of regions. In the arrangement of FIG. 3, the backlight 112 includes 80 regions (light emitting parts L) of 10 (in the vertical direction)×8 (in the horizontal direction), where the first line has 8 light emitting parts L011 to L018 while the first column has 10 light emitting parts L011 to L101. The light emitting parts L are each controlled by local dimming (local luminance control) in which dimming is performed for each individual light emitting part.

In the present embodiment, the light emitting parts are formed as 80 regions (light emitting parts L) of 10 (in the vertical direction)×8 (in the horizontal direction). However, the number of regions is not limited to this example. For example, the light emitting parts corresponding to the individual light sources are provided so as to control each light emitting part assigned to each individual light source.

Additionally, the present embodiment employs a rectangular form for each light emitting part L. However, the shape of each light emitting part L is not limited to the rectangular form and may be a circular or elliptical form. In another example, light emitting parts have different shapes may be used together.

In FIG. 3, the light emitting parts L are arranged to have a predetermined interval therebetween. However, this is not an absolute requirement and the light emitting parts L may be arranged closely to each other without providing such an interval.

Also in the present embodiment, the light emitting parts L are arranged to form a lattice shape. However, this is not an absolute requirement and the light emitting parts L may be arranged to form a zigzag-latticed shape while being shifted by ½ pitch between adjacent columns or lines.

In addition, the present embodiment employs the direct backlight in which separate light emitting parts are individually controlled. However, the backlight is not limited to a direct type and may be a sidelight type to control divided light emitting regions.

Returning to FIG. 2, a control unit 15 (explained later) is provided at the back surface of the display unit 11, by which the control unit 15 is invisible from the user. Instead of such arrangement of the control unit 15 at the back surface of the display unit 11, the control unit 15 may be provided in the bezel 12 or the display unit 11.

The explanation of the structure of the display unit 11 with reference to FIGS. 2 and 3 is ended here.

Figure 4:
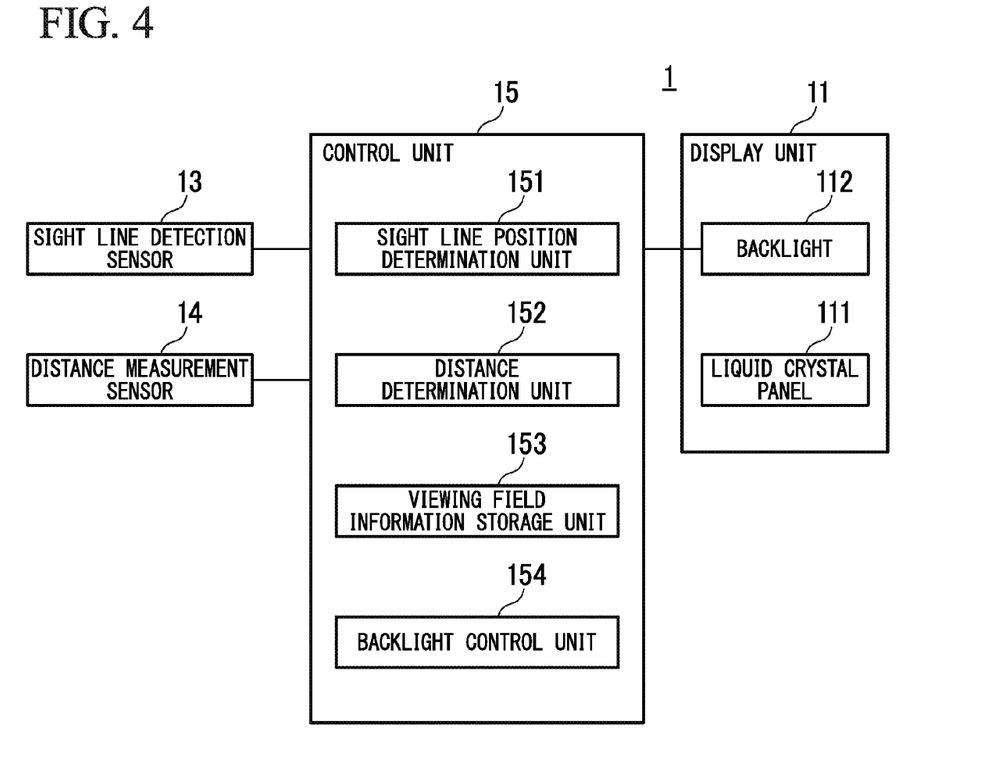
FIG. 4 is a block diagram that shows the functions of the display apparatus.

Next, with reference to FIG. 4, the functions of the display apparatus 1 will be explained. FIG. 4 is a block diagram to show the functions of the display apparatus 1.

In FIG. 4, the display apparatus 1 has the sight line detection sensor 13, the distance measurement sensor 14, the control unit 15, and the display unit 11, as described above.

The control unit 15 has a sight line position determination unit 151, a distance determination unit 152, a viewing field information storage unit 153, and a backlight control unit 154.

The sight line position determination unit 151 determines the position on the display unit 11, to which the sight line of the relevant user is directed, based on the sight line of the user who is viewing the image displayed on the display unit 11, where the sight line is detected by the sight line detection sensor 13. For example, based on the angle of the sight line detected by the sight line detection sensor 13, the sight line position determination unit 151 determines the (plane) coordinates on the display unit 11, to which the relevant sight line of the relevant user is directed. The sight line position determination unit 151 may refer to a predetermined coordinate range on the display unit 11 so as to determine whether or not the coordinates indicated by the sight line is within the coordinate range.

The coordinates (on the display unit 11) determined by the sight line position determination unit 151 depend on the motion of the eyeballs of the user. Therefore, if the eyeballs of the user are not stable, the coordinate values vary considerably. Accordingly, an averaging process of averaging determined coordinate values within a predetermined period of time may be executed.

Although the sight line detection sensor 13 detects the sight line of the user in the present embodiment, the sight line detection sensor 13 may transmit an obtained image to the sight line position determination unit 151, and the sight line position determination unit 151 may detect the sight line of the user from the received image.

Additionally, if the sight line detection sensor 13 detects the sight lines of a plurality of users, the sight line position determination unit 151 may determine the coordinates on the display unit 11 based on the sight lines of the individual users.

The distance determination unit 152 determines a viewing field range on the display unit 11, based on the distance between the display unit 11 and the relevant user, which is measured by the distance measurement sensor 14. The viewing field range is a range on the display unit which is visible to the user and may have any shape. In the present embodiment, a rectangular viewing field range is employed.

For example, the shorter the distance between the display unit 11 and the relevant user, the narrower the viewing field range on the display unit 11 visible to the user. On the contrary, the longer the distance between the display unit 11 and the relevant user, the wider the viewing field range on the display unit 11 visible to the user.

If the angle visible to the eyes of the user is defined to be a viewing field angle, the viewing field range on the display unit 11 can be obtained by using the distance between the display unit 11 and the user and the viewing field angle. In the present embodiment, the viewing field range has a rectangular shape having an aspect ratio according to the viewing field angle. For example, the standard viewing field angle visible to both eyes of the user is 190 degrees in the horizontal direction and 150 degrees in the vertical direction, and thus the rectangular as the viewing field range can have an aspect ratio of 150:90.

In accordance with the predetermined viewing field range and the measured distance, the distance determination unit 152 determines a rectangular region to be the viewing field range. Here, since the viewing field angle depends on the individual, it can be adjusted by using viewing field information set in the viewing field information storage unit 153 (explained later).

Based on the determined rectangular viewing field range, the distance determination unit 152 determines the size of the light emitting parts L included in the viewing field range, which is the sum of the areas of the light emitting parts L included in the viewing field range.

The distance determination unit 152 determines whether or not each light emitting part L is included in the determined viewing field range. For example, if half or greater of the area of each determined rectangular viewing field range is included in the determined viewing field range, the distance determination unit 152 may determine that the relevant light emitting part L is included in the determined viewing field range. In another example, if the entire area of each determined rectangular viewing field range is included in the determined viewing field range, the distance determination unit 152 may determine that the relevant light emitting part L is included in the determined viewing field range.

Since the present embodiment employs a rectangular viewing field range, the region of the light emitting parts L is determined as a rectangular shape. However, if the determination is performed by using a predetermined elliptical viewing field range, the region of the light emitting parts L is also determined as an elliptical shape.

When the distance measurement sensor 14 detects the sight lines of a plurality of users, the distance determination unit 152 may determine the relevant positions of the individual users.

The viewing field information storage unit 153 stores viewing field information of the relevant user. Since the viewing field angle depends on each user, if a fixed viewing field angle is employed, a dark part may be visible to the user in the determined range of the light emitting parts L. Here, if the fixed viewing field angle is set to be wide, the determined range of the light emitting parts L may be unnecessarily wide, which may degrade the power saving effect. Therefore, the viewing field angle depending on each individual user is stored, as viewing field information, in the viewing field information storage unit 153 in advance and can be utilized in the adjustment of the viewing field range.

Any method can be employed to store the viewing field information in the viewing field information storage unit 153. For example, after a predetermined image is displayed on the display unit 11 at a predetermined distance between the display unit 11 and the user, a user's visible status when the user's sight line is directed to the center of the display unit 11 may be stored as the viewing field information. In addition, the viewing field information stored in the viewing field information storage unit 153 may be an adjustment amount with respect to a reference viewing field range, or a viewing field range. For example, an adjustment amount of −10%, 0%, or +10% with respect to a reference viewing field range may be set.

Based on the viewing field information stored in the viewing field information storage unit 153, the distance determination unit 152 adjusts the size of the viewing field range so that a viewing field range suitable for the target user can be set. The size of the range of the light emitting parts L determined by the distance determination unit 152 coincides with the size of a range to which the light amount (i.e., luminance) control is applied by the backlight control unit 154.

In addition, information utilized to adjust the coordinates determined by the sight line position determination unit 151 may be stored in the viewing field information storage unit 153 in advance. As described above, the sight line position determination unit 151 performs the sight line determination based on the position of a pupil or iris of the user. However, the center of the actual viewing field visible to the user may not coincide with the coordinates determined based on the sight line. When the information utilized to correct such an error of the coordinates determined by the sight line position determination unit 151 is stored in the viewing field information storage unit 153 in advance, the sight line position determination unit 151 can adjust the coordinates for each user.

Based on the coordinates based on the user's sight line determined by the sight line position determination unit 151 and the size of the region of the target light emitting parts L determined by the distance determination unit 152, the backlight control unit 154 determines the relevant region of the light emitting parts L in the backlight 112 and controls the target light emitting parts L, which are not included in the determined region, to reduce the amount of light (i.e., luminance) thereof. In the present embodiment, a region (in the entire light emitting parts) whose amount of light is controlled is called a "control region".

That is, since the light emitting parts L (of the backlight 112) visible to the user is made to emit light with an ordinary luminance, the user can view the image displayed on the display unit 11 with the ordinary luminance. In contrast, since the control region is out of the user's viewing field range, it is difficult for the user to recognize the reduction of the luminance and thus the user has no uncomfortable feeling. Therefore, the reduction of the luminance of the light emitting parts L in the control region can reduce the power consumption of the backlight 112 without producing uncomfortable feeling of the user.

The backlight control unit 154 may set a plurality of regions for the light emitting parts L based on the sight lines of a plurality of users so as to control the luminance of the light emitting parts L according to the set regions of the light emitting parts L.

In the present embodiment, the sight line detection sensor 13 and the distance measurement sensor 14 are provided separately and the luminance of the light emitting parts L is controlled based on the determination results obtained by the sight line position determination unit 151 and the distance determination unit 152. However, the functions of the sight line detection sensor 13 and the distance measurement sensor 14 may be implemented by one sensor. For example, the user's sight line and the distance to the user may be simultaneously detected from a video obtained by using a video camera.

The explanation (using FIG. 4) of the functions of the display apparatus 1 is ended here.

Figure 5:
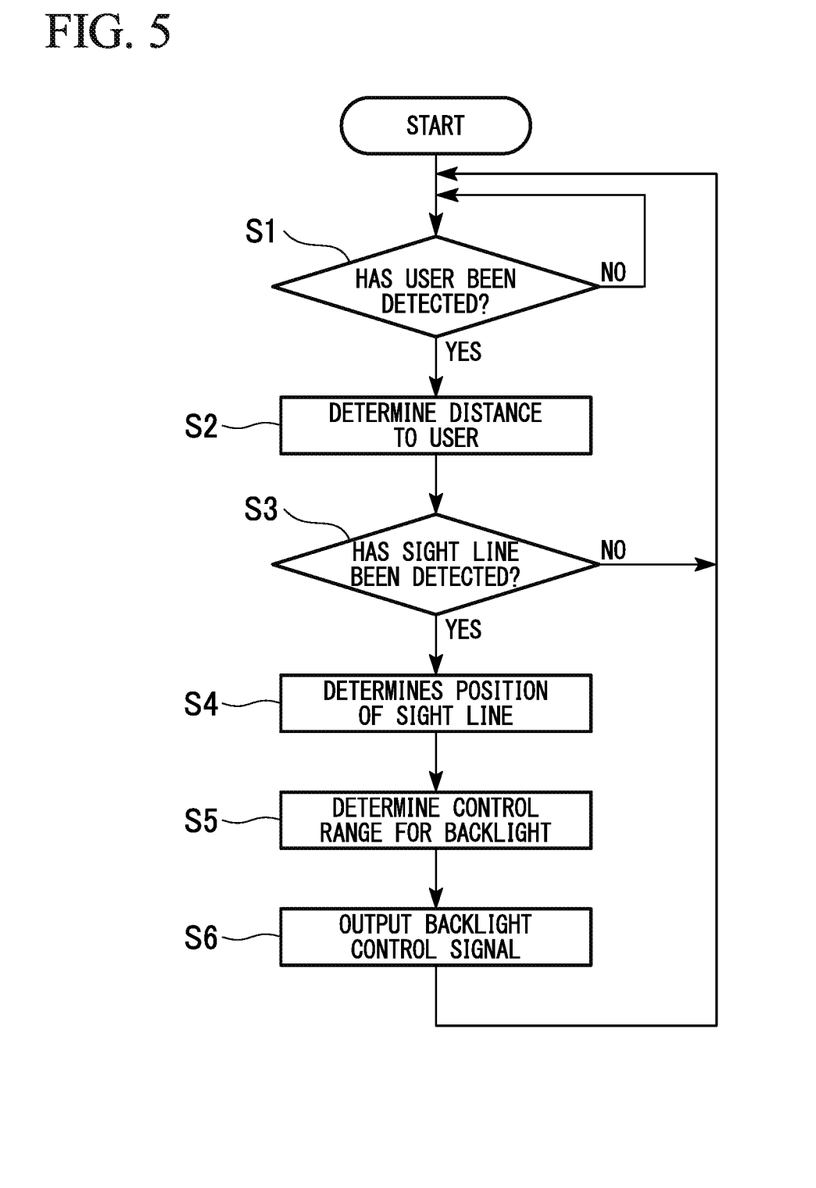
FIG. 5 is a flowchart showing the operation of a control unit.

Next, with reference to FIG. 5, the operation of the control unit 15 will be explained. FIG. 5 is a flowchart showing the operation of the control unit 15.

In FIG. 5, the control unit 15 determines whether or not a user has been detected (see step S1). The user detection may be implemented by the distance determination unit 152 which determines whether or not the distance measurement sensor 14 has detected a user.

If no user has been detected (i.e., "NO" in step S1), the control unit 15 executes the process in step S1 again. Accordingly, the process in step S1 is repeated until a user is detected.

In contrast, if a user has been detected (i.e., "YES" in step S1), the control unit 15 determines the distance to the user (see step S2). As described above, the determination of the distance to the user is performed based on the distance to the user measured by the distance measurement sensor 14.

After executing step S2, the control unit 15 determines whether or not the sight line has been detected (see step S3). Here, whether or not the sight line has been detected can be determined by the sight line position determination unit 151. More specifically, it can be determined by the sight line position determination unit 151 which determines whether or not the coordinates of the sight line detected by the sight line detection sensor 13 are on the display unit 11. Therefore, even if a user has been detected in step S1, when the user is not viewing the display unit 11, it is determined in step S3 that no sight line has been detected.

If no sight line has been detected (i.e., "NO" in step S3), the control unit 15 executes the process in step S1 again. Accordingly, even if a user has been detected, the processes in step S1 to S3 are repeated until a sight line is detected.

In contrast, if the sight line has been detected (i.e., "YES" in step S3), the control unit 15 determines the position of the sight line (see step S4). The position of the sight line is determined as the coordinates on the display unit 11. As described above, the control unit 15 may determine the coordinates as an average within a predetermined period of time.

After executing step S4, the control unit 15 determines a control range for the backlight 112 (see step S5). This determination can be performed by determining the above-described region for the light emitting parts L based on the distance between the determined sight line position and the user.

After executing step S5, the control unit 15 outputs a control signal utilized to control the luminance, to each relevant light emitting part L of the backlight 112 (see step S6). In the present embodiment, power saving is implemented by reducing the luminance of the light emitting parts in the control region (i.e., out of the visible region for the user) while the luminance of the light emitting parts in the visible region is not changed.

The explanation (using FIG. 5) of the operation of the control unit 15 is ended here.

Figure 6A:
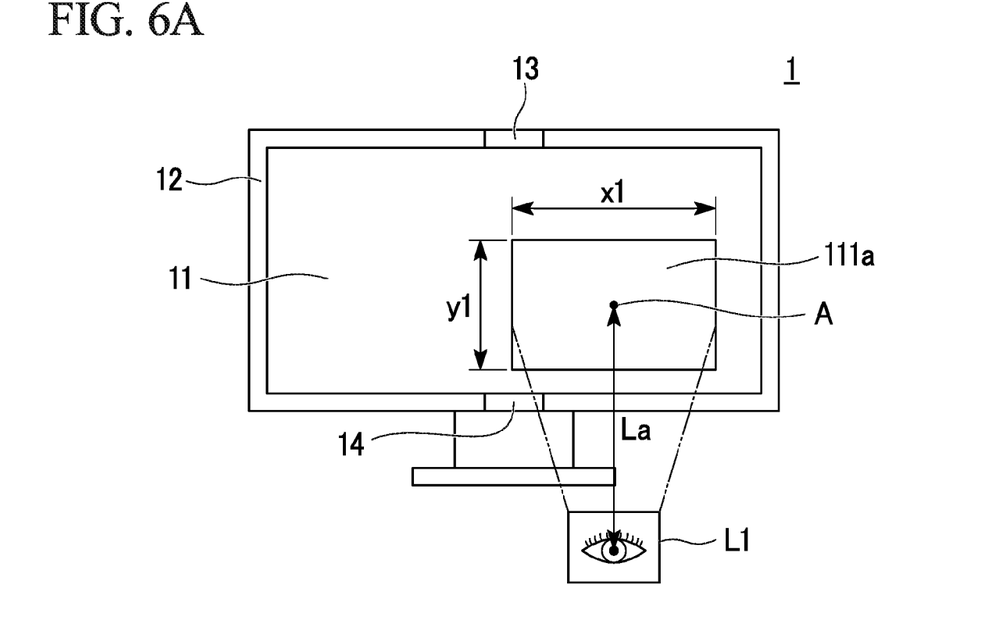
FIG. 6A is a diagram that shows a region whose light emission is controlled.
Figure 6B:
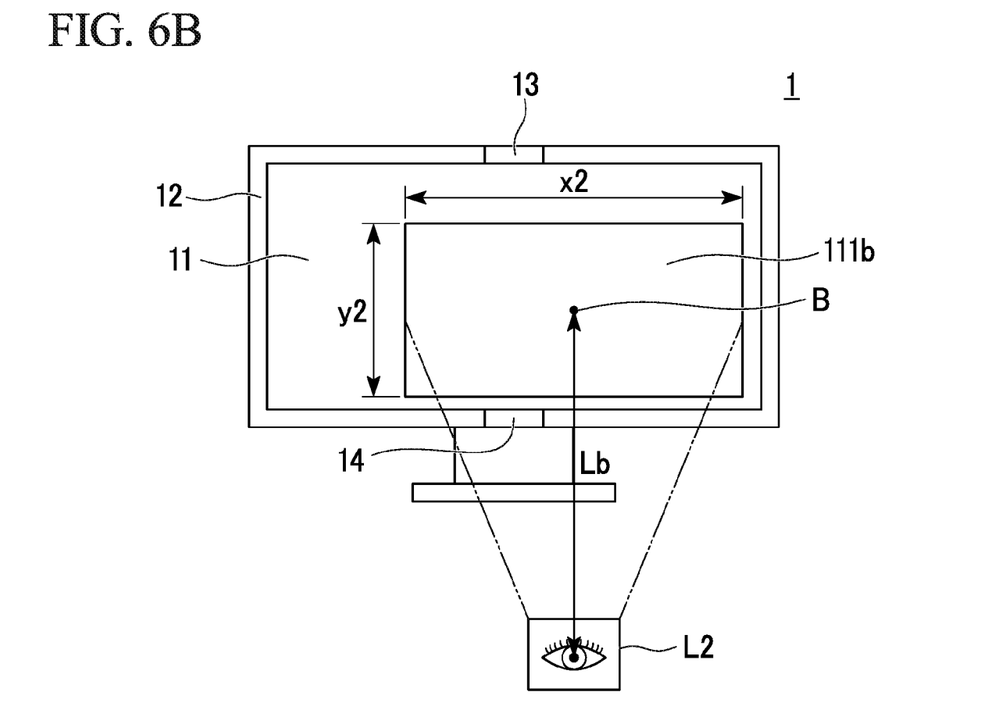
FIG. 6B is also a diagram that shows a region whose light emission is controlled.

Next, with reference to FIGS. 6A and 6B, the region whose light emission is controlled will be explained. In FIG. 6A, the distance between the display unit 11 and the user is La, which is shorter than a distance Lb between the display unit 11 and the user in FIG. 6B. In FIGS. 6A and 6B, parts identical to those in FIG. 1 are given identical reference numerals and explanations thereof are omitted here.

In FIG. 6A, a position L1 of the user is present at the distance La from the display unit 11 and is closer to the display unit 11 than a position L2 of the user shown in FIG.

6B. A region 111a indicated on the display unit 11 has a center point A and a size of x1 in the horizontal direction and y1 in the vertical direction. As described above, the center point A is a point on the display unit 11, which is determined by the sight line position determination unit 151 based on the user's sight line. That is, it is assumed here that the user is viewing the display unit 11 where the center of the viewing is present at the center point A.

As described above, the region 111a defined by x1 and y1 is set according to the distance between the display unit 11 and the user, which is determined by the distance determination unit 152. Therefore, when the user has approached the display unit 11, the area of the region 111a is reduced. Since the control unit 15 reduces the luminance of the light emitting parts in the control region outside the region 111a, when the user has approached the display unit 11, the control region is enlarged so that the range of the light emitting parts whose luminance is reduced is enlarged, which reduces the power consumption.

In FIG. 6B, the position L2 of the user is present at the distance Lb from the display unit 11 and is farther away from the display unit 11 than the position L1 of the user shown in FIG. 6A. A region 111b indicated on the display unit 11 has a center point B and a size of x2 in the horizontal direction and y2 in the vertical direction. As described above, the center point B is a point on the display unit 11, which is determined by the sight line position determination unit 151 based on the user's sight line. That is, it is assumed here that the user is viewing the display unit 11 where the center of the viewing is present at the center point B.

As described above, the region 111b defined by x2 and y2 is set according to the distance between the display unit 11 and the user, which is determined by the distance determination unit 152. Therefore, when the user has moved away from the display unit 11, the area of the region 111b increases in comparison with the region 111a. The control unit 15 can reduce the power consumption by decreasing the luminance of the light emitting parts in the control region outside the region 111b.

That is, the display apparatus 1 of the present embodiment varies the target region of the light emitting parts, which is subjected to the luminance control, in accordance with the variation in the distance between the display unit 11 and the user. Therefore, the display apparatus 1 can display an image having a high luminance in a region visible to the user while reducing the luminance in the control region which is not viewed by the user. Accordingly, it is possible to reduce the power consumption without producing uncomfortable feeling of the user.

In the present embodiment, the luminance of the control region outside the region 111a or 111b is reduced uniformly. However, this luminance may be reduced gradually in a manner such that the farther the position in the control region from the user's viewing field range, the greater the degree of the luminance reduction applied to the position. When the luminance is reduced gradually, it is difficult for the user to recognize the luminance reduction in the control region.

The explanation (using FIGS. 6A and 6B) of the region in the light emitting parts, whose light emission is controlled, is ended here.

Figure 7:
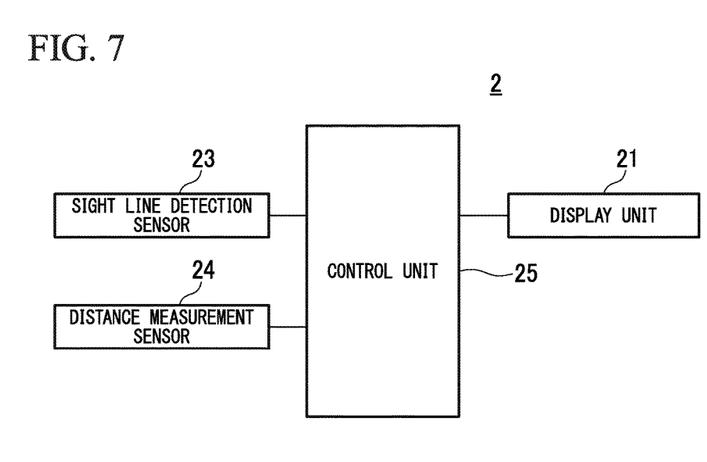
FIG. 7 is a block diagram that shows the functions of a display apparatus as an embodiment of the present invention.

Next, with reference to FIG. 7, functions of a display apparatus 2 as an embodiment of the present invention will be explained. FIG. 7 is a block diagram showing the functions of the display apparatus 2.

In FIG. 7, the display apparatus 2 includes a display panel 21, a sight line detection sensor 23 utilized to detect a sight line of a user, a distance measurement sensor 24 utilized to measure a distance to the user, and a control unit 25. Based on the sight line detected by the sight line detection sensor 23 and the distance measured by the distance measurement sensor 24, the control unit 25 determines a control region in separate light emitting parts arranged on the display panel 21, where the amount of light emission is controlled in the control region.

The above sight line detection sensor 23, the distance measurement sensor 24, and the control unit 25 have functions similar to those of the sight line detection sensor 13, the distance measurement sensor 14, and the control unit 125 and thus further detailed explanations thereof are omitted.

The explanation (using FIG. 7) of the functions of the display apparatus 2 is ended here.

In the above-described embodiment in FIG. 1, the display unit 11 employs a liquid crystal panel. However, an organic EL display, a plasma display, or the like, may be employed. Specifically, the present invention can be applied to an organic EL display, a plasma display, or the like, that can perform the local dimming in which a plurality of light emitting parts can be controlled individually.

Additionally in the embodiment in FIG. 1, the sight line detection sensor 13 and the distance measurement sensor 14 are provided at the bezel 12 of the display apparatus 1. However, they may be provided at a position away from the bezel 12.

The above-described control unit 15 or 25 may be implemented by using a computer to which the display unit can be connected. In this case, a program for executing the individual functional blocks may be stored in a computer readable storage medium, and the program stored in the storage medium may be loaded and executed on a computer system, so as to perform the relevant functions.

Here, the computer system has hardware resources which may include an OS and peripheral devices.

The above computer readable storage medium is a storage device, for example, a portable medium such as a flexible disk, a magneto optical disk, a ROM, or a CD-ROM, or a memory device such as a hard disk built in a computer system. The computer-readable storage medium may also include a device for temporarily storing the program, for example, (i) a device for dynamically storing the program for a short time, such as a communication line used when transmitting the program via a network (e.g., the Internet) or a communication line (e.g., a telephone line), or (ii) a volatile memory in a computer system which functions as a server or client in such a transmission.

In addition, the program may execute a part of the above-explained functions. The program may also be a "differential" program so that the above-described functions can be executed by a combination of the differential program and an existing program which has already been stored in the relevant computer system. Furthermore, the program may be implemented by utilizing a programmable logic device such as an FPGA (field programmable gate array).

Additionally, in the individual functions of the display apparatus 1 or 2, some of the shown functional blocks may be implemented as one functional block as far as this block has the relevant functions shown in FIG. 1, 7, or the like. On the contrary, one shown functional unit may be implemented as separate functional units.

While preferred embodiments of the present invention have been described and shown above, it should be understood that these are exemplary embodiments of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A display apparatus having a display panel and a backlight divided into a plurality of light-emitting parts, comprising:
   a sight line detection sensor that detects a sight line of a user;
   a distance measurement sensor that measures a distance between the display panel and the user; and
   a control unit that determines a user-viewing region of the backlight including a center point, corresponding to the sight line of the user, and a specific number of light-emitting parts of the backlight depending on the distance measured by the distance measurement sensor, and a control region of the backlight precluding the user-viewing region, thus reducing the brightness of the control region.

2. The display apparatus in accordance with claim 1, wherein the control unit decreases the user-viewing region so as to increase the control region as the distance decreases, and
   wherein the control unit increases the user-viewing region so as to decrease the control region as the distance increases.

3. The display apparatus in accordance with claim 1, wherein the control unit comprises:
   a viewing field information storage unit that stores viewing field information about the user; and
   the control unit that adjusts the control region based on the viewing field information stored in the viewing field information storage unit.

4. The display apparatus according to claim 1, wherein the backlight is divided into the plurality of light-emitting parts, each having a predetermined shape and a predetermined size, which are arranged in rows and columns on the display panel and each of which is independently subjected to local dimming.

5. The display apparatus according to claim 1, wherein the control unit sets a normal brightness without reducing brightness in the user-viewing region.

6. The display apparatus according to claim 1, wherein the control unit reduces brightness in the light-emitting parts of the control region distanced from the center point.

7. The display apparatus according to claim 1, wherein the plurality of light-emitting parts are each independently subjected to local dimming by the control unit.

8. The display apparatus according to claim 1, wherein the control unit only reduces the brightness of the control region and maintains a current brightness of the user-viewing region.

9. The display apparatus according to claim 1, wherein the sight line detection sensor detects a plurality of sight lines of a plurality of users and determine the sight line to each of the plurality of users.

10. The display apparatus according to claim 1, wherein the control unit reduces the brightness of the control region while controlling the backlight to have high brightness in the user-viewing region.

11. The display apparatus according to claim 1, wherein the control region is outside of the user-viewing region.

12. A display method adapted to a display apparatus having a display panel and a backlight divided into a plurality of light-emitting parts, comprising:
   detecting a sight line of a user;
   measuring a distance between the display panel and the user; and
   determining a user-viewing region of the backlight including a center point, corresponding to the sight line of the user, and a specific number of light-emitting parts of the backlight depending on the distance measured between the display panel and the user, and a control region of the backlight precluding the user-viewing region, thus reducing the brightness of the control region.

13. A non-transitory computer-readable storage medium storing a program causing a computer of a display apparatus, having a display panel and a backlight divided into a plurality of light-emitting parts, to implement the display method according to claim 12.

* * * * *